Sept. 10, 1957 T. O. LILLQUIST 2,806,149
WHEEL SLIP CONTROL SYSTEM
Filed Jan. 15, 1954
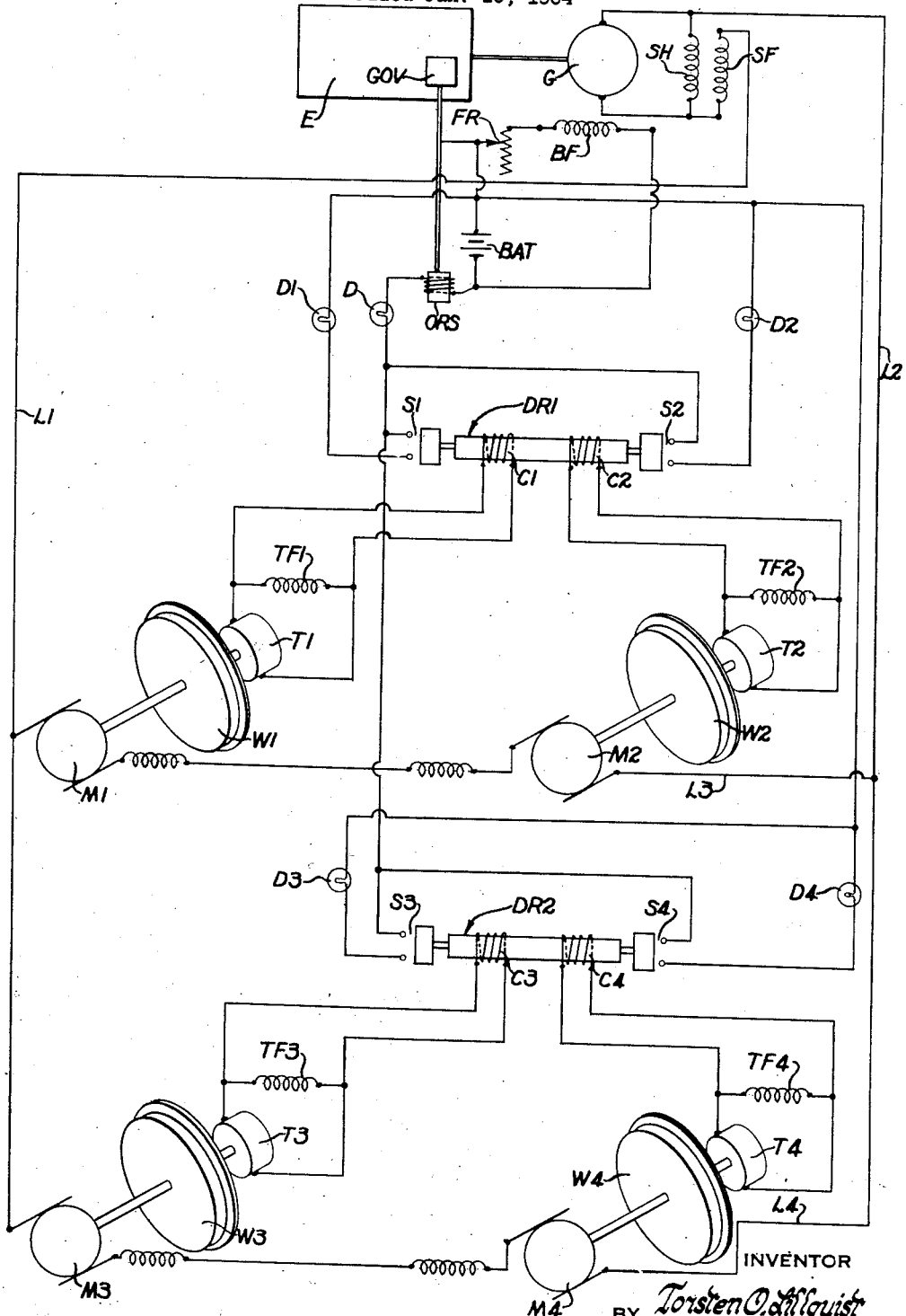
INVENTOR
Torsten O. Lillquist
BY
L. C. Thorpe
ATTORNEY

United States Patent Office 2,806,149
Patented Sept. 10, 1957

2,806,149

WHEEL SLIP CONTROL SYSTEM

Torsten O. Lillquist, La Grange Park, Ill., assignor to General Motors Corporation, Detroit, Mich., a corporation of Delaware Application January 15, 1954, Serial No. 404,219

3 Claims. (Cl. 290—17)

This invention relates generally to control systems for electric traction locomotives and more particularly to wheel slip control systems for such locomotives.

In locomotive operation when a traction wheel starts to slip, the traction motor driving such wheel will tend to overspeed. Such wheel slip will occur at low speeds when the locomotive is starting to pull the train or pulling hard. It will also occur at high speeds even though the torque of the traction motor falls off as its speed increases as a result of a reduced coefficient of friction between the wheel and rail caused by the presence of water or oil, insects, or wet foliage on the track or from a momentary removal of weight from the motor wheel caused by rough track or switches. Unless this tendency to slip is carefully controlled and inhibited, slippage will result in loosened and damaged armature windings with consequent maintenance problems and expenses. Effective detection and control of slip will also improve locomotive performance and prevent possible accidents due to the presence of locked axles.

Conventional methods of wheel slip control for such locomotives consist of removing or reducing the field excitation of the traction generator supplying power to the wheel driving traction motors in response to the unbalance of voltage or current occurring between the traction motors on slippage of a traction wheel. These two much used schemes of detecting load unbalance for such traction motors have several disadvantages.

Control systems operating on unbalance in traction motor current decrease in sensitivity as the speed increases since such current is an inverse function of speed. The control devices such as relays, however, generally operate on a fixed differential in motor current and this means that the speed differential between motors to produce the required relay operating current must be greater at high speed than at low speed since motor current per revolution is lower. Since the field shunting of such traction motors is generally used over a part of the locomotive speed range, the current is further reduced in the motor fields at high speed. A further disadvantage of this system is that when a motor is inoperative for any reason, the wheel slip protection on the remaining motors is lost and the system will give no indication of locked axles.

When differential armature voltage is utilized to indicate wheel slip, the opposite characteristics of those of a current indication system obtain since the motor voltage is relatively low at low speed. Where the locomotives change motor connections from series-parallel to parallel at some intermediate speed, as is usually the case, this type of system cannot be used at high speeds where it has its greatest sensitivity.

In those conventional systems where the field winding of the generator supplying power to the wheel driving traction motors are discharged upon slippage of a traction wheel, there is a prolonged interruption in power supplied to the motors with a corresponding prolonged interruption in the motor torque and acceleration of the locomotive and train hauled thereby. Also upon reexcitation of the generator field winding the power output returns to the original value at which wheel slippage occurred usually causing a recurrence of wheel slippage unless the locomotive engineer reduces the power output of the power plant.

The principal object of the present invention is to control and limit wheel slippage without attention on the part of the locomotive engineer and to indicate occurrence of such slippage in the locomotive cab by provision of an automatic power plant control means which is directly responsive to any differential in speed occurring between the various traction wheels.

It is a further object of this invention to provide such an automatic power plant control means which will preclude sudden and prolonged changes in the speed, load, and output of the power plant and in the torque of the traction motors after wheel slippage occurs thereby reducing the tractive effort of the locomotive only enough to stop slippage under any rail condition.

Other objects and advantages of the invention together with other novel features embodied therein, will become apparent from the following detailed description with reference to the single accompanying drawing illustrating a form of the combined generator electric traction and control system by which these objects are accomplished.

As illustrated in the drawing the locomotive traction and control system includes a power plant including a prime mover E of the Diesel type and a compound electric generator G shown directly connected thereto and driven thereby. The power plant supplies power to a plurality of series type electric traction motors M1, M2, M3 and M4 shown operatively connected to separate traction wheels W1, W2, W3 and W4 of the locomotive in the conventional manner. Power for the traction motors is supplied by line conductors L1 and L2 extending from the opposite terminals of the generator G and are shown to connect the motors in series parallel with the motors M1 and M2 being connected in series by line L3 and motors M3 and M4 being connected in series by line L4. While the drawing shows a series-parallel connection for diagrammatic purposes, it is contemplated that the control system of this invention may be incorporated in a locomotive having means for changing the motor connections from series-parallel to parallel at intermediate speeds.

The speed, load, and output controlling means for the power plant includes a conventional engine driven governor GOV operating the Diesel engine fuel regulator, not shown, and a field rheostat FR for a battery excited field winding BF of the generator G to maintain any one of a preselected number of substantially constant speed, load, and power output values of the power plant in a well-known manner. The governor GOV is also provided with conventional speed and load setting means, not shown, operable to select the particular speed, load, and power output at which it is desired to have the power plant operate. The governor is also provided with an overriding solenoid ORS energizable to override the governor and cause movement of the field rheostat toward the maximum resistance setting to be decreasing the generator excitation and the power output.

In addition to the battery excited field winding BF provided for the generator G, a shunt connected field winding SH and also series connected differential, compensating, and commutating field windings collectively designated by the symbol SF are provided for the generator.

Identical individual speed indicating generators T1, T2, T3, and T4 provided with shunt field excitation TF1, and TF2, TF3, and TF4 are each operatively connected to and driven by the separate motor-driven traction wheels W1, W2, W3, and W4, respectively. The terminals of the generators T1 and T2 are connected to the coils C1 and C2, respectively, of a differential relay DR1 and the terminals of the generators T3 and T4 are connected to the coils C3 and C4, respectively, of a differential relay DR2. It will be readily appreciated that similar differential relays may also be provided which will be responsive to the differential speed indicating output of generator T1 and T3; T2 and T4; T1 and T4; and T2 and T3.

The coils C1 and C2 of the differential relay DR1 and the coils C3 and C4 of the differential relay DR2 are wound in bucking relation. The differential relays serve to close one of a plurality of switches S1, S2, S3, and S4 in response to a differential in wheel speed indicating current which occurs upon slippage of a traction wheel. The switches S1 and S2 are operable by the differential relay DR1 and the switches S3 and S4 are operable by the differential relay DR2. The switches S1, S2, and S3 and S4 are each in series with the governor overriding wheel slip control solenoid ORS, the battery BAT, a general wheel slip indicating light or device D, and a specific wheel slip indicating light or device D1, D2, D3, or D4, respectively. The closure of any of these switches causes energization of the wheel slip control solenoid ORS which overrides the governor GOV to control the generator load regulator or rheostat FR thereby reducing the battery field excitation BF of the generator. Closing one of these switches also energizes the general wheel slip indicating light or device D and the specific wheel slip indicator controlled by such switch, both of which are located in the engineer's compartment of the locomotive.

In operation when a traction wheel, by way of example W1, of the locomotive starts to slip, the traction motor M1 driving such wheel will rotate faster than the other wheels on the locomotive truck. The wheel-driven generator T1 will then rotate faster than the generator T2 which is driven by the wheel W2 driven by the motor M2. This will result in a greater current flowing in C1 than in C2 causing the differential relay DR1 to close the switch S1. When the circuit is completed through S1, current will flow from the battery BAT through the circuit comprising the individual wheel slip indicating device D1, the switch S1, the general wheel slip indicating device D, and the overriding solenoid ORS. Energization of the solenoid ORS will cause it to override the governor GOV and cause movement of the field rheostat FR towards the maximum resistance setting decreasing the excitation of the battery field windings BF of the generator and thereby the power output. When the motors have slowed down to the point where the wheel W1 is no longer slipping, the differential relay DR1 will open the switch S1 deenergizing the overriding solenoid. The governor GOV will then take over operation of the field rheostat FR.

Slippage of traction wheel W2, W3 or W4 would similarly cause the differential relay to close one of the switches thereby energizing the overriding solenoid ORS and the slip indicating devices D1 and D2, D3 or D4 as the case may be. Reduction of the battery field excitation by the solenoid ORS would then occur until the particular wheel is no longer slipping and then the current balance in the particular differential relay would return the closed switch to its open position and the governor GOV would take over from the overriding solenoid ORS.

From the foregoing description it will be apparent to those skilled in the art that the slip detection and control means of the present invention is directly responsive to wheel slip rather than being indirectly responsive to such factors as motor current or voltage which vary according to the speed, load, and motor connections of the traction motors. It will also be appreciated that the wheel driven generators T1, T2, T3, and T4 and the differential relays DR1 and DR2 may be of either the direct or alternating current type.

While only one specific embodiment of the invention has been shown and described for the purposes of illustration it is appreciated that various minor modifications may be made without departing from the spirit and scope of the invention as defined in the following claims.

I claim:

1. A wheel slip detection and control system for a multi-wheel vehicle having a plurality of traction motors adapted to drive separate traction wheels and having an electric generating plant for supplying power to said traction motors, said system including means operable to control the output of said power plant, a solenoid selectively energizable and operably associated with said power plant control means to effect a reduction in the output of said power plant upon energization of said solenoid, circuit means including a plurality of switches independently closable to provide alternate connections between said solenoid and an energizing power source, said switches being arranged in pairs, a differential relay means associated with each pair of said switches and selectively operable to alternatively close said switches, each of said relay means including a pair of opposing windings, each of said relay windings being connected to a signal generator drivingly connected to one of said motor driven traction wheels and operable to produce an output signal proportional to the speed thereof, and each of said relay means being responsive to a slip indicating differential in the wheel speed signals generated by the signal generators connected thereto to close one of the switches associated therewith thereby energizing said solenoid to effect a reduction in the output of said power plant until said slip condition is eliminated.

2. A wheel slip detection and control system as set forth in claim 1, in which said circuit means includes a plurality of visual slip indicating devices selectively connectable to said energizing power source by the relay-controlled closing of said switches whereby the slippage of any one of said traction wheels may be independently observed by the operator of said vehicle.

3. In a multi-wheel vehicle having a plurality of traction motors adapted to drive separate traction wheels and having means associated therewith for supplying electrical power to said traction motors, an indicating apparatus of the type described comprising a plurality of electrical indicating devices, circuit means including a plurality of switches closable to establish separate connections between each of said indicating devices and an energizing power source, a differential relay means operable to alternatively close each pair of said switches, each of said relay means including two opposing windings connected to separate signal generators drivingly connected to separate traction wheels, said generators being operable to produce output signals proportional to the rotational speeds of their associated traction wheels, and each of said relay means being responsive to a predetermined differential in the wheel speed signals generated by the signal generators connected thereto to close one of the switches associated therewith thereby energizing the slip indicating device associated with said one switch.

References Cited in the file of this patent

UNITED STATES PATENTS

| | | |
|---|---|---|
| 2,337,717 | Hines | Dec. 28, 1943 |
| 2,371,832 | Lillquist | Mar. 20, 1945 |
| 2,403,933 | Lillquist | July 16, 1946 |
| 2,516,198 | Frier | July 25, 1950 |
| 2,652,555 | Smith | Sept. 15, 1953 |